(12) United States Patent
Li et al.

(10) Patent No.: US 8,145,483 B2
(45) Date of Patent: Mar. 27, 2012

(54) SPEECH RECOGNITION METHOD FOR ALL LANGUAGES WITHOUT USING SAMPLES

(76) Inventors: Tze Fen Li, Taichung (TW); Tai-Jan Lee Li, Taichung (TW); Shih-Tzung Li, Taichung (TW); Shih-Hon Li, Taichung (TW); Li-Chuan Liao, Taichung (TW)

( * ) Notice: Subject to any disclaimer, the term of this patent is extended or adjusted under 35 U.S.C. 154(b) by 399 days.

(21) Appl. No.: 12/535,755

(22) Filed: Aug. 5, 2009

(65) Prior Publication Data

US 2011/0035216 A1    Feb. 10, 2011

(51) Int. Cl.
*G10L 15/00* (2006.01)
(52) U.S. Cl. .................. 704/236; 704/231; 704/243
(58) Field of Classification Search ........... 704/231–245
See application file for complete search history.

(56) References Cited

U.S. PATENT DOCUMENTS

| | | | | |
|---|---|---|---|---|
| 5,839,103 A | * | 11/1998 | Mammone et al. | 704/232 |
| 6,032,116 A | * | 2/2000 | Asghar et al. | 704/238 |
| 6,151,573 A | * | 11/2000 | Gong | 704/256.2 |
| 6,980,952 B1 | * | 12/2005 | Gong | 704/234 |
| 7,499,857 B2 | * | 3/2009 | Gunawardana | 704/255 |
| 7,509,256 B2 | * | 3/2009 | Iwahashi et al. | 704/233 |
| 2002/0152069 A1 | * | 10/2002 | Gao et al. | 704/240 |
| 2007/0129943 A1 | * | 6/2007 | Lei et al. | 704/240 |
| 2007/0198260 A1 | * | 8/2007 | Deng et al. | 704/237 |
| 2008/0215318 A1 | * | 9/2008 | Zhang et al. | 704/231 |
| 2009/0228273 A1 | * | 9/2009 | Wang et al. | 704/235 |
| 2010/0262425 A1 | * | 10/2010 | Tanabe et al. | 704/233 |
| 2011/0066434 A1 | * | 3/2011 | Li et al. | 704/241 |

\* cited by examiner

*Primary Examiner* — Douglas Godbold

(57) ABSTRACT

The invention can recognize any several languages at the same time without using samples. The important skill is that features of known words in any language are extracted from unknown words or continuous voices. These unknown words represented by matrices are spread in the 144-dimensional space. The feature of a known word of any language represented by a matrix is simulated by the surrounding unknown words.

The invention includes 12 elastic frames of equal length without filter and without overlap to normalize the signal waveform of variable length for a word, which has one to several syllables, into a 12×12 matrix as a feature of the word. The invention can improve the feature such that the speech recognition of an unknown sentence is correct. The invention can correctly recognize any languages without samples, such as English, Chinese, German, French, Japanese, Korean, Russian, Cantonese, Taiwanese, etc.

9 Claims, 4 Drawing Sheets

SPEECH RECOGNITION METHOD FOR ALL LANGUAGES WITHOUT USING SAMPLES

BACKGROUND OF THE INVENTION

1. Field of the Invention

This invention is a method for speech recognition on all languages without using samples of a word. A word may contain one or more syllables. A sentence in any language consists of several words. The method includes 12 elastic frames of equal length without filter and without overlap to normalize the waveform of a word to produce a 12×12 matrix of linear predict coding cepstra (LPCC). A word with the 12×12 matrix of LPCC is considered as a vector in the 144-dimensional vector space. Several hundreds of different "unknown" words of unknown languages or unknown voices are represented by vectors, spreading in the 144-dimensional vector space. When a speaker utters a known word of any language, the feature of the known word is simulated or computed by the unknown vectors around it in the space and then the feature of the known word is stored in the word database.

The invention contains 12 elastic frames to normalize a word, a Bayesian pattern matching method to select a known word for the input unknown word, a segmentation method for an unknown sentence or name to be partitioned into a set of D unknown words and a screening method to select a known sentence or name from database. This invention does not use any known samples and is able to recognize a sentence of any language correctly

2. Description of the Prior Art

In the recent years, many speech recognition devices with limited capabilities are now available commercially. These devices are usually able to deal only with a small number of acoustically distinct words. The ability to converse freely with a machine still represents the most challenging topic in speech recognition research. The difficulties involved in speech recognition are:

(1) to extract linguistic information from an acoustic signal and discard extra linguistic information such as the identity of the speaker, his or her physiological and psychological states, and the acoustic environment (noise), (2) to normalize an utterance which is characterized by a sequence of feature vectors that is considered to be a time-varying, nonlinear response system, especially for an English words which consist of a variable number of syllables, (3) to meet real-time requirement since prevailing recognition techniques need an extreme amount of computation, and (4) to find a simple model to represent a speech waveform since the duration of waveform changes every time with nonlinear expansion and contraction and since the durations of the whole sequence of feature vectors and durations of stable parts are different every time, even if the same speaker utters the same words or syllables.

These tasks are quite complex and would generally take considerable amount of computing time to accomplish. Since for an automatic speech recognition system to be practically useful, these tasks must be performed in a real time basis. The requirement of extra computer processing time may often limit the development of a real-time computerized speech recognition system.

A speech recognition system basically contains extraction of a sequence of feature for a word, normalization of the sequence of features such that the same words have their same feature at the same time position and different words have their different own features at the same time position, segmentation of an unknown sentence or name into a set of D unknown words and selection of a known sentence or name from a database to be the unknown one.

The measurements made on speech waveform include energy, zero crossings, extrema count, formants, linear predict coding cepstra (LPCC) and Mel frequency cepstrum coefficient (MFCC). The LPCC and the MFCC are most commonly used in most of speech recognition systems. The sampled speech waveform can be linearly predicted from the past samples of the speech waveform. This is stated in the papers of Markhoul, John, Linear Prediction: A tutorial review, Proceedings of IEEE, 63(4) (1975), Li, Tze Fen, Speech recognition of mandarin monosyllables, Pattern Recognition 36(2003) 2713-2721, and in the book of Rabiner, Lawrence and Juang, Biing-Hwang, Fundamentals of Speech Recognition, Prentice Hall PTR, Englewood Cliffs, N.J., 1993. The LPCC to represent a word provides a robust, reliable and accurate method for estimating the parameters that characterize the linear, time-varying system which is recently used to approximate the nonlinear, time-varying response system of the speech waveform. The MFCC method uses the bank of filters scaled according to the Mel scale to smooth the spectrum, performing a processing that is similar to that executed by the human ear. For recognition, the performance of the MFCC is said to be better than the LPCC using the dynamic time warping (DTW) process in the paper of Davis, S. B. and Mermelstein, P., Comparison of parametric representations for monosyllabic word recognition in continuously spoken sentences, IEEE Trans. Acoustic Speech Signal Process, ASSP-28(4), (1980), 357-366, but in the recent research including the present invention, the LPCC gives a better recognition than the MFCC by the use of the Bayesian classifier with much less computation time. There are several methods used to perform the task of utterance classification. A few of these methods which have been practically used in automatic speech recognition systems are dynamic time warping (DTW) pattern matching, vector quantization (VQ) and hidden Markov model (HMM) method. The above recognition methods give good recognition ability, but their methods are very computational intensive and require extraordinary computer processing time both in feature extraction and classification. Recently, the Bayesian classification technique tremendously reduces the processing time and gives better recognition than the HMM recognition system. This is given by the papers of Li, Tze Fen, Speech recognition of mandarin monosyllables, Pattern Recognition 36(2003) 2713-2721 and Chen, Y. K., Liu, C. Y., Chiang, G. H. and Lin, M. T., The recognition of mandarin monosyllables based on the discrete hidden Markov model, The 1990 Proceedings of Telecomunication Symposium, Taiwan, 1990, 133-137, but the feature extraction and compression procedures, with a lot of experimental and adjusted parameters and thresholds in the system, of the time-varying, nonlinear expanded and contracted feature vectors to an equal-sized pattern of feature values representing a word for classification are still complicate and time consuming. The main defect in the above or past speech recognition systems is that their systems use many arbitrary, artificial or experimental parameters or thresholds, especially using the MFCC feature. These parameters or thresholds must be adjusted before their systems are put in use. Furthermore, the existing recognition systems are not able to identify the English word or Chinese syllable in a fast or slow speech, which limits the recognition applicability and reliability of their systems.

Therefore, there is a need to find a speech recognition system, which can naturally and theoretically produce an equal-sized sequence of feature vectors to well represent the nonlinear time-varying waveform of a word so that each feature vector in the time sequence will be the same for the same words and will be different for different words, which provides a faster processing time, which does not have any arbitrary, artificial or experimental thresholds or parameters and which has an ability to identify the words in a fast and slow utterance in order to extend its recognition applicability. The most important is that the speech recognition system must be very accurate to identify a word or a sentence in all languages.

SUMMARY OF THE PRESENT INVENTION

It is therefore an object of the present invention to provide a method to overcome the aforementioned difficulties encountered in the prior art and the most important object of the present invention is to provide a method to create the features of words in all languages without samples so that the invention without using samples is still able to recognize all languages correctly.

Specifically, the main object of the present invention is to use several hundreds of unknown voices in any unknown languages to simulate or compute the feature of a known word and therefore the present invention does not require any known samples to compute the feature of a known word so that the present invention without using known samples is still able to recognize all languages correctly. The second object of the present invention is to provide a fixed number E of elastic frames of equal length without filter and without overlap to normalize the waveform of variable length of a word to produce an equal-sized matrix of features to represent the word such that the same words have the same feature at the same time position and different words have their different own features in the same time position in the matrix. The third object in the present invention is to provide a technique to extract an accurate feature which is relatively stable to each other and truly represents a word and to define a clear territory of feature value for each word to be easily identified by a classifier. The fourth object of the present invention is to provide a Bayesian decision classifier which gives the minimum probability of misclassification. The fifth object of the present invention is to provide a modification technique to improve the feature for a word such that the word is guaranteed to be identified. The sixth object of the present invention is to create the feature of a new word at any time without using its samples. The present invention has the following advantages:

(1). The pattern recognition system is naturally and theoretically derived based on the nonlinear time-varying waveforms without any arbitrary, or experimental parameters or thresholds in order to improve recognition ability.

(2). The uniform segmentation on the whole waveform of a word (a single syllable is also a word with one single syllable) with E equal elastic frames without filter and without overlap can use the same j-th elastic frame, j=1, . . . , E, to catch in time order the same feature for the same words and different features for the different words.

(3). The pattern recognition system can immediately classify an unknown word after extraction of the feature by E elastic frames without further compressing or warping or adjusting the length of the sequence of features since the features are already pulled to the same time position.

(4). Since E elastic frames do not overlap over each other, less number of frames can cover the whole waveform of a word and save computation time both in extracting features and recognition.

(5). E equal elastic frames segment the whole waveform of a word and can stretch and contract themselves to cover the whole speech waveform to produce an equal-sized matrix of features and hence the present invention can recognize a word (with one to several syllables) with too short or too long speech waveform.

(6). The whole algorithm to extract feature and to classify an unknown word is simple and time-saving.

(7). The main technique in the present invention is to find the N unknown words of unknown languages on the basis of the Bayesian distance to each known word and use such N unknown words to compute the feature of the known word and hence tremendously raises the recognition ability without need of any known samples.

(8). Another main technique in the present invention is to provide 2 skills to modify and improve the feature of a word such that the word is guaranteed to be correctly identified.

(9). The present invention provides a segmentation skill to segment an unknown sentence or name into a set of D unknown words and a screening window to select a known sentence or name from the sentence and name database to be a unknown sentence or name uttered by a speaker.

(10). The present invention provides a technique to frequently relocate the features of all words such that all known words have their own relative territories evenly spreading in the 144-dimensional space, and hence it will increase the recognition ability.

BRIEF DESCRIPTION OF THE DRAWINGS

A word may contain one or more syllables. The invention needs a raw database of unknown words or voices with samples or without samples.

DETAILED DESCRIPTION OF THE PREFERRED EMBODIMENT

Figure 1:
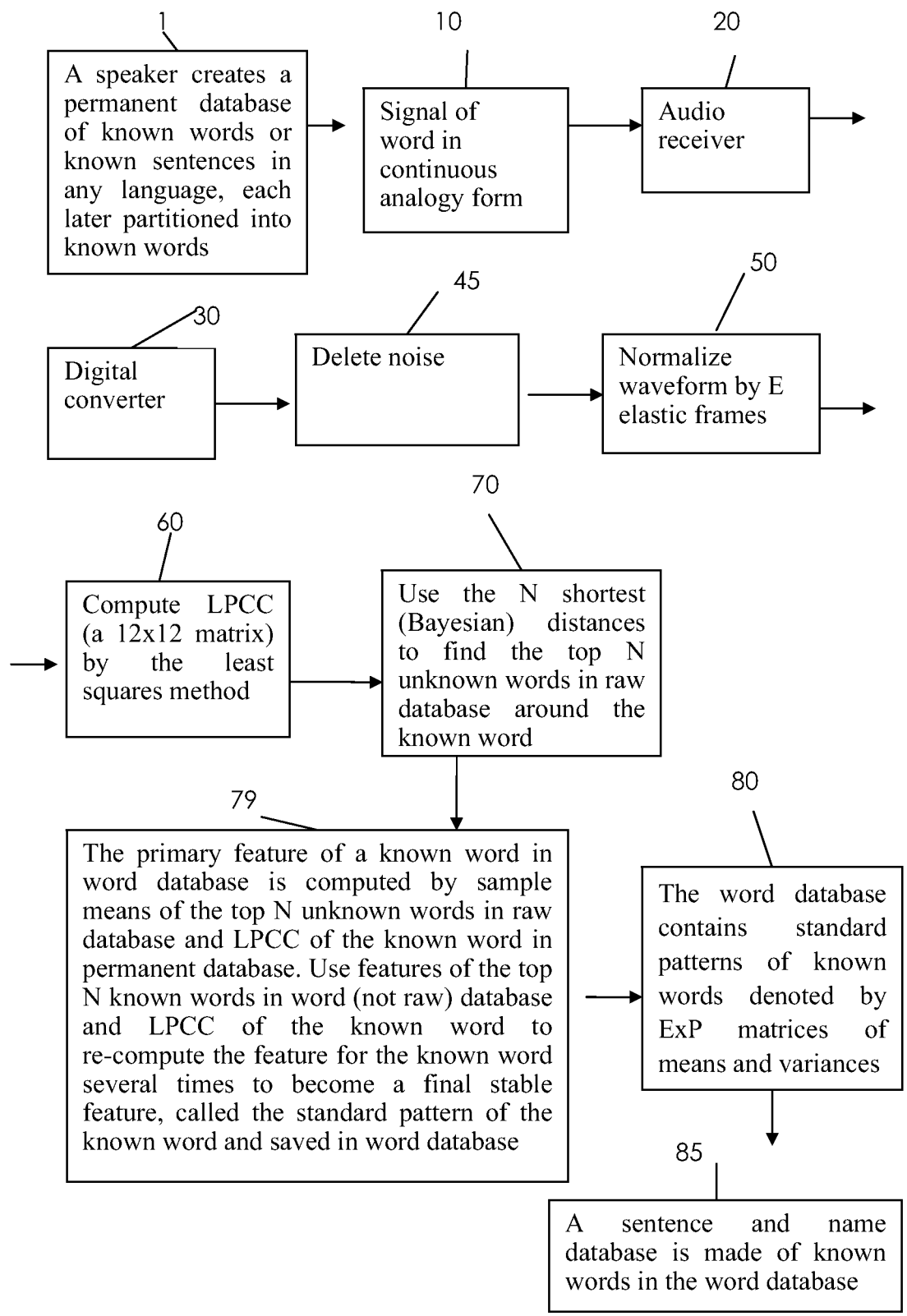
FIG. 1 is a flow-chart diagram showing how a permanent database of known words for the testing speaker, a word database of equal-sized standard patterns denoting all known words by using the top N unknown words in the raw database surrounding the known word, and a sentence and name database made of known words are established.

Any continuous voice is represented by a word which contains from one to several syllables. A raw database contains a large number of unknown words or continuous voices with sample means and sample variances. If there are no samples, it may need more unknown words or voices. FIG. 1 shows the creation of a permanent database of known words or sentences (later partitioned into known words) of any languages pronounced by a speaker with standard, clear and distinct utterance 1 or by a testing speaker if the testing speaker has a special accent. A known word has a continuous analog form 10 which enters an audio receiver 20 for receiving a series of speech waveform representing the known word utterance. A digital converter 30 then converts this waveform into a series of digital signals. A preprocessor 45 receives the series of digital signals from the digital converter 30 to delete the noise and the time intervals which do not have speech digital signals. After deletion of noise, the waveform left from deletion forms a real speech waveform denoting a word utterance. Then the total length of the new waveform denoting a word is uniformly partitioned into E equal segments by E elastic frames 50 without filter and without overlap. Since the size of the frames is proportional to the total length of speech waveform denoting a word, the E frames are called the elastic frames which can stretch and contract themselves to cover the whole waveforms of variable length for the word. A word has a waveform of variable length uttered by different speaker or even by the same speaker. Each word has the same number E of equal elastic frames without filter and without overlap to cover its waveform, i.e., a word with a short waveform has less sampled points in a frame and a word with a long waveform has more sampled points in a frame. For the waveforms of various lengths denoting the same word, the sampled points both in a short frame and in a long frame carry the same amount of same feature information if they are recognized as the same word by human ears. The E frames are plain and elastic without Hamming or any other filter and without overlap, contracting themselves to cover the short speech waveform produced by the short pronunciation of a word and stretching themselves to cover the long speech waveform produced by long pronunciation of a word without the need of deleting or compressing or warping the sampled points or feature vectors as in the dynamic time-warping matching process and in the existent pattern recognition systems. After uniform segmentation processing on waveform with E equal elastic frames 50 without filter and without overlap to cover the waveform, the sampled points in each frame are used to compute 60 the least squares estimates of regression coefficients, since a sampled point of speech waveform is linearly dependent of the past sampled points by the paper of Makhoul, John, Linear Prediction: A tutorial review, Proceedings of IEEE, 63(4) (1975). The least squares estimates in a frame are called the linear predict coding coefficients (a LPC vector) having normal distributions, which are then converted into a more stable LPC cepstra (a LPCC vector of dimension P). A word is represented by a E×P matrix of LPCC. This will be described below. A collection of hundreds of unknown words of any languages, called a raw database, are prepared to have their samples transformed into the matrices of LPCC to represent the unknown words. The samples of the same unknown word are used to compute a E×P matrix of sample means and variances to represent the unknown word. Therefore there are hundreds of matrices of sample means and sample variances (considered as vectors of dimension E×P) in the raw database spreading in the E×P-dimensional vector space. To find the feature of a known word in the permanent database for a speaker, this invention use the top N surrounding unknown words in the raw database with the N shortest Bayesian distances (described below) to the known word in the E×P-dimensional vector space 70 to compute or simulate the feature of the known word, i.e., compute the weighted averages of the N sample means of the top N unknown words and the LPCC of the known word as the means for the known word and compute the weighted averages of N sample variances of the top N unknown words from the raw database as the variances for the known word (the known word does not have sample variance) 79. If the unknown words do not have samples, consider the N LPCC of the top N unknown words in the raw database with the N shortest distances to the known word 70 and the LPCC of the known word in the permanent database as (N+1) data and compute weighted average of (N+1) LPCC as the mean for the known word and compute the variance of (N+1) LPCC as the variance for the known word 79. The E×P matrix of means and variances represents the primary feature of the known word and is saved in the word database. If the primary feature of a known word in the word database does not have the least Bayesian distance to the LPCC of the same known word in the permanent database among all known words in the word database, from the word database (not the raw database), find the top N known words in the word database in stead of the N unknown words in the raw database, with the N shortest Bayesian distances to the known word in the permanent database, and re-computer the feature of the known word in the word database. Repeat computing the features of all known words in the database several times to relocate the features of all known words in the word database so that all known words have relatively stable features to each other in the word database 79 and then the final feature of each known word is called the standard pattern of the known word and is saved in the word database 80, but the LPCC of all known words in the permanent database for the speaker never changes. From the word database 80, make necessary sentences and names (a set of known words), which are saved in the sentence and name database 85.

Figure 2:
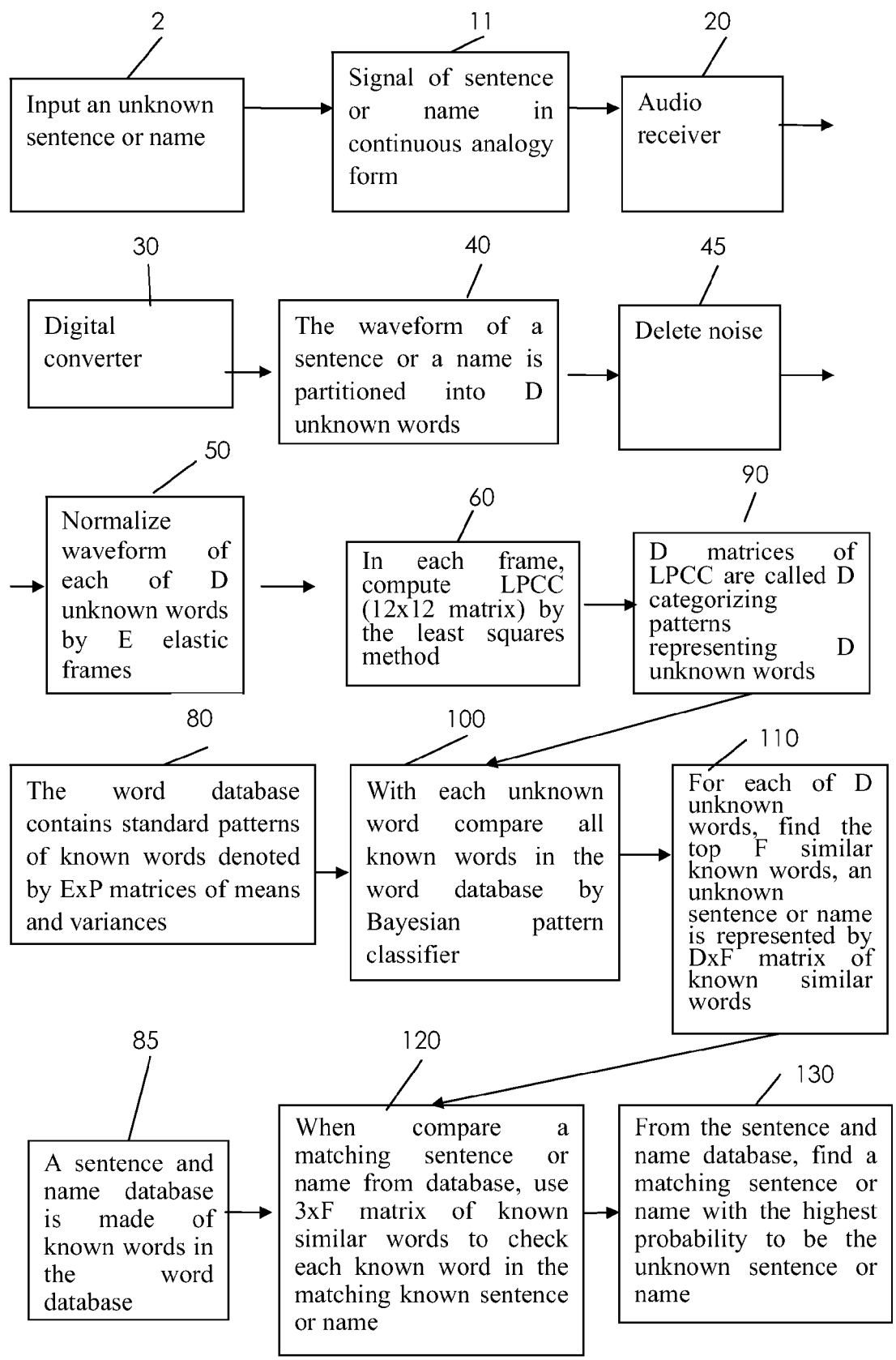
FIG. 2 is the flow-chart diagram showing the processing steps of segmentation of an unknown sentence or name into unknown words, normalization of the waveform of each unknown word using E elastic frames without filter and without overlap, extraction of LPCC feature for each unknown word represented by an equal-sized matrix of LPCC and identification of each unknown word by the Bayesian classifier and finally identification of the unknown sentence or name by a screening window technique.

FIG. 2 shows a speech recognition system. Begin with an input unknown sentence or name 2, which is a long signal waveform in a continuous analogy form 11, received by the audio receiver 20. A digital converter 30 then converts the long waveform into a series of digital signals. The speech recognition system in the invention partitions the unknown sentence or name into a set of D unknown words 40. Each unknown word is represented by a sequence of digitized signal waveform data. A preprocessor deletes noise 45. The digital waveform data of each unknown word is segmented into E equal intervals. Each interval is called an elastic frame 50. Therefore, E elastic frames are disjointed and do not use any filter. In each interval (elastic frame) of digital signal points, since the signal sampled point is a linear combination of previous sampled points, we can find the linear predict coding cepstra (LPCC) using the least squares method 60. A E×P matrix of LPCC is used to represent the unknown word and the E×P matrix of LPCC is called the categorizing pattern of the unknown word. Hence an unknown sentence or name is represented by a sequence of D E×P matrices of LPCC, i.e., D unknown categorizing patterns 90. The invention uses a Bayesian pattern classifier to compare each of D unknown categorizing patterns with all known standard patterns from the word database 100. In the unknown sentence or name, for each of D unknown words, find the top F similar known words from the word database with the F shortest Bayesian distances to the unknown word. The unknown sentence or name is represented by a D×F matrix of known similar words in the word database 110. The invention provides a 3×F screen window method 120 to select a known sentence or name from the sentence and name database 85, which has the highest probability to be selected as the unknown sentence or name 130. The invention also provides 2 important skills to modify and improve the feature (means and variances) of a word in the word database such that the recognition of an unknown sentence or name is correct.

As follows is the detailed description of the present invention:

1. FIG. 1 shows the flowchart for establishing a permanent database of known words represented by E×P matrices of LPCC for the testing speaker, a word database of known words represented by E×P matrices of means and variances, and a sentence and name database. The raw database has hundreds of unknown words or voices with sample means and sample variances which may belong to one or several languages or the raw database has more unknown words or unknown voices without samples. The permanent database only contains the LPCC of the known words pronounced by a speaker with standard, clear and distinct utterance or the testing speaker if the testing speaker has a special accent, but the word database contains the features (means and variances) of known words. In this invention, we need a large set of various unknown words or unknown voices with samples. When an unknown word (voice) inputs 1, it is a series of speech signal in an analogy waveform 10 received by an audio receiver 20 and digitized into a sequence of sampled points 30. A method to eliminate noise in the invention is to use the sample variance of a fixed number of sequential sampled points to detect the real speech signal, i.e., the sampled points with small variance do not contain speech signal. Another way in the invention is to compute the sum of the absolute values of differences of two consecutive sampled points in a fixed number of sequential speech sampled points, i.e., the speech data with small sum of absolute values do not contain real speech signal. In our speech recognition experiment, the latter provides slightly faster and more accurate speech recognition.

2. In the invention, we first normalize the whole digital waveform and then extract the feature representing the known word. Since in the paper of Markhoul, John, Linear Prediction: A Tutorial Review, Proceedings of the IEEE, 63(4), 1975, the sampled signal point S(n) can be linearly predicted from the past P sampled points, a linear approximation S'(n) of S(n) can be formulated as:

$$S'(n) = \sum_{k=1}^{P} a_k S(n-k), n \geq 0 \quad (1)$$

where P is the number of the past samples and the least squares estimates $a_k$, k=1, ..., P, are generally referred to be the linear predict coding coefficients (a LPC vector) which have normal distributions. The LPC method (the least squares method) provides a robust, reliable and accurate method for estimating the linear regression parameters that characterize the linear, time-varying regression system which is used to approximate the nonlinear, time-varying system of the speech waveform of a word. Hence, in order to have a good estimation of the nonlinear time-varying system by the linear regression models, the invention uses a uniform segmentation on the speech waveforms. Each segment is called an elastic frame 50. There are E equal elastic frames without filter and without overlap which can freely contract or expand themselves to cover the whole speech waveform of the word. E equal elastic frames can produce in time order the same LPC feature vectors (the least squares estimates, which have normal distributions) by the least squares method 60 for the same words which have various lengths of speech waveforms, even uttered by the same speaker. All signal sampled points are not filtered as in Hamming window. The number of the sampled points in a frame is proportional to the total points of a speech waveform. The same word can be uttered in variable lengths of speech waveforms by the same or different speakers. For the same words, a small number of sampled points in the j-th short frame of a short speech waveform carry the same amount of the same feature information as a large number of sampled points in the j-th long frame of a long speech waveform if they can be recognized as the same word by human ears. From experiments, E=12 gives a better recognition rate. Let $E_1$ be the squared difference between S(n) and S'(n) over N+1 samples of S(n), n=0, 1, 2, ..., N, where N is the number of sampled points in a frame proportional to the length of speech waveform denoting a word, i.e., $$E_1 = \sum_{n=0}^{N}\left[S(n) - \sum_{k=1}^{P} a_k S(n-k)\right]^2 \quad (2)$$

To minimize $E_1$, taking the partial derivative for each i=1, ..., P on the right side of (2) and equating it to zero, we obtain the set of normal equations:

$$\sum_{k=1}^{P} a_k \sum_{n} S(n-k)S(n-i) = \sum_{n} S(n)S(n-i), 1 \leq i \leq P \quad (3)$$

Expanding (2) and substituting (3), the minimum total squared error, denoted by $E_P$ is shown to be $$E_P = \sum_{n} S^2(n) - \sum_{k=1}^{P} a_k \sum_{n} S(n)S(n-k) \quad (4)$$

Eq (3) and Eq (4) then reduce to $$\sum_{k=1}^{P} a_k R(i-k) = R(i), 1 \leq i \leq P \quad (5)$$

$$E_P = R(0) - \sum_{k=1}^{P} a_k R(k) \quad (6)$$

respectively, where $$R(i) = \sum_{n=0}^{N-i} S(n)S(n+i), i \geq 0 \quad (7)$$

Durbin's recursive procedure in the book of Rabiner, L. and Juang, Biing-Hwang, Fundamentals of Speech Recognition, Prentice Hall PTR, Englewood Cliffs, N.J., 1993, can be specified as follows $$E_0 = R(0) \quad (8)$$

$$k_i = \left[R(i) - \sum_{j=1}^{i-1} a_j^{(i-1)} R(i-j)\right] / E_{i-1} \quad (9)$$

$$a_i^{(i)} = k_i \quad (10)$$

$$a_j^{(i)} = a_j^{(i-1)} - k_i a_{i-j}^{(i-1)}, 1 \leq j \leq i-1 \quad (11)$$

$$E_i = (1-k_i^2)E_{i-1} \quad (12)$$

Eq (8)-(12) are solved recursively for i=1, 2, ..., P. The final solution (LPC coefficient or least squares estimate) is given by $$a_j = a_j^{(P)}, 1 \leq j \leq P \quad (13)$$

The LPC coefficients are then transformed into the cepstra (LPCC) 60 $\hat{a}_i$, i=1, ..., P, in Rabiner and Juang's book, by $$\hat{a}_i = a_i + \sum_{j=1}^{i-1} \left(\frac{j}{i}\right) a_{i-j} \hat{a}_j, \ 1 \le i \le P \quad (14)$$

$$\hat{a}_i = \sum_{j=i-P}^{i-1} \left(\frac{j}{i}\right) a_{i-j} \hat{a}_j, \ P < i \quad (15)$$

Here in our experiments, P=12, because the cepstra in the last few elements are almost zeros. The whole waveform of the unknown word (voice) in the raw database is transformed into a E×P matrix of LPCC. Since an unknown word (voice) in the raw database has samples, use its samples to compute the E×P matrix of sample means and sample variances of LPCC to represent the unknown word (voice). Therefore, there are hundreds of unknown words (or unknown voices) in the raw database with their matrices of sample means spreading (better uniformly) in the E×P dimensional vector space. The creation of a permanent database of known words or sentences (sentences later are partitioned into known words which are again saved in the permanent database) of any languages for the testing speaker is to pronounce a known word only once by a speaker with a standard, clear and distinct utterance 1 or by the testing speaker if the testing speaker has a special accent. Use steps 10-60 to obtain a matrix of LPCC for the known word. The collection of all matrices of LPCC for all known words is called a permanent database of known words for the testing speaker. A particular speaker with different accents may need his or her permanent database.

3. For each known word in the permanent database, use the N shortest Bayesian distances to find the top N unknown words in the raw database surrounding the known word 70 in the 144-dimensional vector space to compute the feature of the known word, i.e., compute the weighted average of the N sample means of the top N unknown words in the raw database and the LPCC of the known word in the permanent database as the mean for the known word and the weighted average of the N sample variances of the top N unknown words as the variance for the known word (the known word in the permanent database does not have variance) 79. If the unknown words and voices in the raw database do not have samples, find the top N unknown words or voices in the raw database with the N shortest absolute distances to the known word in the permanent database 70 and consider the N LPCC of the top N unknown words or voices and the LPCC of the known word as (N+1) data and compute the weighted average of (N+1) LPCC as the mean for the known word and the variance of (N+1) LPCC as the variance for the known word 79. The 12×12 matrix of means and variances is called the primary feature of the known word and saved in the word database 80.

4. After compute the features of all known words in the permanent database for the testing speaker, if the Bayesian distance between the feature (means and variances) of a known word in the word database and the LPCC of the same known word in the permanent database is not the shortest among all known words in the word database, find the top N known words in the word database (not the raw database) with the N shortest Bayesian distances to the LPCC of the known word in the permanent database and re-compute the weighted average of the N means of the top N known words in the word database and the LPCC of the known word as the new mean for the known word and the weighted average of the N variances of the top N known words in the word database as the new variance for the known word. The E×P matrix of the new means and the new variances is the new feature of the known word. After repeat re-computing the new feature of each word in the word database several times, all known words in the word database will have relatively stable features to each other in the E×P dimensional space. The final feature denoted by the E×P matrix of means and variances of each known word is called the standard pattern denoting the known word 79 and saved in the word database 80. The LPCC of the known words in the permanent database does not change. From the word database, we can make any sentence or name and save it into the sentence and name database 85.

5. Use the E equal elastic frames without filter and without overlap and Durbin's recursive formula (8-15) to compute an equal-sized E×P matrix of LPCC of an unknown input word. The E×P matrix of LPCC is called the categorizing pattern of the unknown word.

6. FIG. 2 shows a flowchart of recognition on an unknown sentence or name. We first input an unknown sentence or name 2 which is a speech signal in the analogy waveform 11 received by an audio receiver 20. The analogy waveform of the unknown sentence or name is digitized into a series of speech sampled points 30. The series of sampled points is partitioned into D unknown words. The number D may not the actual number of unknown words, i.e., the unknown sentence or name may contain D−1 or D+1 words. The partition skill is to add the absolute distances between any two consecutive sampled points in a unit time interval. If the total of absolute distances is less than the total of absolute distances of noise points, the unit time interval does not contain speech signal. If the unit time intervals without speech signals are cumulated to a certain amount (more than the time between two syllables in a word), it must be a border line between two unknown words 40. The noise of each of D unknown words in the unknown sentence or name is deleted 45. After deletion, the speech digital waveform of each of D unknown words is normalized by E equal elastic frames without filter and without overlap 50. In each frame, the speech digital waveform is used to compute LPCC by using the least squares method 60. An unknown word in the sentence or name is represented by an equal-sized E×P matrix of LPCC. Hence an unknown sentence or name is represented by D matrices of LPCC 90.

7. The speech processor 100 now receives the categorizing pattern of E LPCC vectors denoting an unknown words, represented by $X=(X_1, \ldots, X_E)$, with $X_j$ denoting the j-th vector of P LPC cepstra $X_j=(X_{j1}, \ldots, X_{jP})$ computed from sampled points of the speech waveform in the j-th equal elastic frame by the least squares method. The categorizing pattern of E feature vectors $(X_1, \ldots, X_E)$ is a E×P matrix of LPCC $X=\{X_{jl}\}$, j=1, ..., E, l=1, ..., P, where the random variables $\{X_{jl}\}$ have normal distributions and E=P=12. The unknown word belongs to one of m categories (m is the total number of known words in the word database) $\omega_i$, i=1, ..., m. Consider the decision problem consisting of determining whether X belongs to $\omega_i$. Let $f(x|\omega_i)$ be the conditional density function of X of the unknown words given the known words $\omega_i$. Let $\theta_i$ be the prior probability of $\omega_i$ such that $\Sigma_{i=1}^m \theta_i=1$, i.e., the $\theta_i$ is the probability for the category $\omega_i$ to occur. Let d be a decision rule. A simple loss function $L(\omega_i, d(x))$, i=1, ..., m, is used such that the loss $L(\omega_i, d(x))=1$ when $d(x) \ne \omega_i$ makes a wrong decision and the loss $L(\omega_i, d(x))=0$ when $d(x)=\omega_i$ makes a right decision. Let $\tau=(\theta_1, \ldots, \theta_m)$ and let $R(\tau,d)$ denote the risk function (the probability of misclassification) of d. Let $\Gamma_i$, i=1, ..., m, be m regions separated by d in the E×P-dimensional domain of X, i.e., d decides $\omega_i$ when X∈$\Gamma_i$. Then the minimum probability of misclassification is $$R(\tau, d) = \sum_{i=1}^{m} \theta_i \int L(\omega_i, d(x)) f(x | \omega_i) dx \qquad (16)$$

$$= \sum_{i=1}^{m} \theta_i \int_{\Gamma_i^c} f(x | \omega_i) dx$$

where $\Gamma_i^c$ is the complement of $\Gamma_i$. Let D be the family of all decision rules which separate m categories. Let the minimum probability of misclassification be denoted by $$R(\tau, d_\tau) = \min_{d \in D} R(\tau, d) \qquad (17)$$

A decision rule $d_\tau$ which satisfies (17) is called the Bayes decision rule with respect to the prior distribution τ and can be represented as:

$$d_\tau(x) = \omega_i \text{ if } \theta_i f(x|\omega_i) > \theta_j f(x|\omega_j) \qquad (18)$$

for all j≠1, i.e., $\Gamma_i = \{x | \theta_i f(x|\omega_i) > \theta_j f(x|\omega_j)\}$ for all j≠i.

The E×P feature values of the E×P matrix of LPC cepstra denoted by x={$x_{jl}$} in the categorizing pattern denoting an unknown word are assumed to have independent normal distributions (LPC vector has normal distributions). The conditional normal density of x={$x_{jl}$} given the known words $\omega_i$ can be represented as $$f(x | \omega_i) = \left[ \prod_{jl} \frac{1}{\sqrt{2\pi} \sigma_{ijl}} \right] e^{-\frac{1}{2} \sum_{jl} \left( \frac{x_{jl} - \mu_{ijl}}{\sigma_{ijl}} \right)^2} \qquad (19)$$

where i=1, ..., m (m=the total number of known words in the word database). Taking logarithm on both sides of (19), the Bayes decision rule (18) with equal prior on each word becomes $$l(\omega_i) = \sum_{jl} \ln(\sigma_{ijl}) + \frac{1}{2} \sum_{jl} \left( \frac{x_{jl} - \mu_{ijl}}{\sigma_{ijl}} \right)^2, i = 1, \ldots, m. \qquad (20)$$

In (20), the value $l(\omega_i)$ means the difference between the LPCC $x_{jl}$ 90 of the unknown word and the means $\mu_{ijl}$ 80 of each known word $\omega_i$ weighted by the variances $\sigma_{ijl}^2$ 80 of the known word $\omega_i$, where $\mu_{ijl}$ is estimated by the weighted average of N sample means computed by N unknown words in the raw database and the LPCC of the known word in the permanent database and where $\sigma_{ijl}^2$ is estimated by the weighted average of N sample variances computed from N unknown words surrounding the known word $\omega_i$, called an equal-sized standard pattern denoting the known word and stored in the word database. The Bayes decision rule (20), which is called the Bayesian distance and measures the similarity between the unknown word X={$X_{jl}$} and the known word $\omega_i$, decides a known word $\omega_i$ with the least $l(\omega_i)$ to which the unknown word with the matrix X={$X_{jl}$} of LPCC belongs 100.

8. A technique in the present invention is to re-compute all features of all known words in the word database several times 79 such that each known word can have a better and more relatively stable feature to each other in the word database and the E×P variance matrix of the known word (19) can represent a better and more accurate territory $$\Gamma_i = \{x | \theta_i f(x|\omega_i) > \theta_j f(x|\omega_j)\}, j \neq i \qquad (21)$$

defined by the Bayesian decision rule such that it does not overlap with the territory of any other known word in the word database.

9. The present invention provides another important technique to modify and improve the feature of a word such that the word is guaranteed to be recognized correctly. This invention provides two skills to improve the feature of a word ω:

(a). Use the Bayesian classifier (20) to find the top N known words denoted by N matrices of means and variances {$\mu_{ijl}$, $\sigma_{ijl}^2$}, i=1, ..., N, from the word database with the N shortest Bayesian distances (20) to the word ω. Find the average (weighted average) of N matrices, $$\mu_{jl} = \sum_{i=1}^{N} \mu_{ijl} / N, \sigma_{jl}^2 = \sum_{i=1}^{N} \sigma_{ijl}^2 / N.$$

The averages (or weighted averages) {$\mu_{jl}$, $\sigma_{jl}^2$}, j=1, ..., E, l=1, ..., P, are used as the new feature (the standard pattern) of the word ω.

(b). Use the weighted average of the LPCC of the word ω by the test speaker and the N means of the top N known words in the word database with the N shortest Bayesian distances to the word ω as the means $\mu_{jl}$ and denote the weighted average of the N variances $\sigma_{jl}^2$ of the top N known words with the N shortest Bayesian distances (20) to the word ω in the word database as the variances $\sigma_{jl}^2$. Then {$\mu_{jl}$, $\sigma_{jl}^2$}, j=1, ..., E, l=1, ..., P, are used as the new feature (the new standard pattern) of the known word ω in the word database 80.

10. The present invention is able to establish a word database for any language only using the raw database of unknown words or unknown voices.

11. In order to show the recognition rate and fast recognition by the present invention, we implement a series of speech recognition experiments in Chinese, in English, in a mixture of English and Chinese with a couple of Japanese, German and Taiwanese words:

(a). First of all, we have to build a raw database of unknown words. We bought such a raw database from the Central Research Institute (Sinica) in Taiwan. They all are uttered by several hundreds of female speakers. We select the syllables which have at least 6 complete samples. The syllable database which we are able to use for testing has 388 mandarin syllables with 6 to 99 samples. The total number of samples of 388 syllables is 12400. We use Eq. 8-15 to obtain LPCC for each syllable and compute the sample means and sample variances. We take off all identities of 388 mandarin syllables and index 388 mandarin syllables by numbers which have no information to the mandarin syllables. We consider 388 syllables without identities as 388 unknown words with their sample means and sample variances saved in the raw database. A female and a male pronounce 154 English words, 1 German word, 1 Japanese word, 3 Taiwanese and 654 mandarin syllables for two permanent databases individually. Therefore, we have a raw database of 388 unknown words and two permanent databases with a total of 813 different known words (b). To create the feature of each known word in the permanent database, we use the Bayesian classifier (20) to find the top N=15 unknown words in the raw database with the N shortest Bayesian distances to the known word. Compute the weighted average of N=15 sample means of the top N=15 unknown words in the raw database and the LPCC of the known word in the permanent database as the mean for the known word and the weighted average of N sample variances of the top N unknown words in the raw database as the variance for the known word, i.e., the 12×12 matrix of means and variances denoting the primary feature of each known word in the word database and after re-computing the features of all known words in the word database several times, the final feature is the standard pattern (denoted by the E×P matrix of means and variances) of a known word in the word database.

(c). For the word speech recognition tests, if an unknown input word is classified as within top 3 candidates, the recognition is good since too many similar words are in the word database. The following experiments are conducted. The recognition rates depend on speakers.

(i). to classify 384 Mandarin syllables, 2 Taiwanese words, 1 Japanese word and 1 German word (Table 1) (recognition rate=excellent)

(ii). to classify 154 English words and 1 German word (Table 2) (recognition rate=excellent)

(iii). to classify 384 Mandarin syllables, 154 English words, 1 German word, 1 Japanese word and 2 Taiwanese words (recognition rate=excellent)

(iv). to classify 654 Mandarin syllables, and 1 German and 3 Taiwanese and 1 Japanese word (Table 1 and Table 3) (recognition=good)

Note: excellent=almost all are correct, good=90% correct.

12. To classify an unknown sentence or name, we first build a sentence and name database 85, which contains 70 English, 407 Chinese, and 2 Taiwanese sentences and names. The speech recognition method for an unknown sentence or name is described as follows:

(a). A sentence or name is represented by a long sequence of speech sampled points. In a unit time interval, we first compute total sum of distances between any two consecutive points. If the total sum is less than the total sum of noise, the unit interval does not have speech signal. If the unit time intervals without speech signal are cumulated to a certain amount (more than the time between two syllables in a word), it must be a border line between two unknown words (a Chinese syllable is considered as a word with one syllable). The unknown sentence or name is partitioned into D unknown words.

(b). In the sentence and name database, find the unknown sentence or name uttered by a speaker. Since an unknown word may be partitioned into two words, in the sentence and name database, pick up the known sentences or names with D−1, D and D+1 known words for matching the unknown sentence or name.

(c). To each of D unknown words, from the word database 80, find the top F similar known words using the Bayesian classifier (20). The F E×P matrices of means and variances have the F shortest Bayesian distances to the E×P matrix of LPCC representing the unknown word. Therefore, The F matrices may represent F known words from several languages. An unknown sentence or name is represented by D×F matrices of similar known words 110.

(d). If a matching known sentence or name in the sentence and name database 85 has exact D known words, then match each known word of the matching known sentence or name with the top F similar known words in the row order from the first row to the last one. If each row of the top F similar words contains its corresponding known word of the matching sentence or name, there are a number of D unknown words recognized correctly. Hence the matching sentence or name is the unknown sentence or name uttered by the speaker.

(e). If a matching known sentence or name in the sentence and name database 85 does not have the exact number of D known words or in (d), at least one row of F similar known words does not have a known word of the matching sentence or name, we use 3×F screen window (3×F matrix of similar known words) to find the unknown sentence or name. If the 3×F screen window contains the (i−1)-th, i-th and (i+1)-th rows of F similar known words, the screen window checks the i-th known word of the matching sentence or name (of course, the first 2 rows only check the first known word of the matching sentence and name) 120 and compute the probability (the number of known words of the matching sentence or name in the 3×F screen window divided by total number of words in the matching sentence or name). Our 3×F screen window selects the matching sentence or name in the sentence and name database 85 with the highest probability 130.

(f). If the selected matching sentence or name is not the unknown sentence or name uttered by speaker, there must be one or more unknown words which are not in the D×F matrix of similar known words. We use any of 2 skills in 9 to improve the feature of the unknown word. The same unknown sentence or name is guaranteed to be recognized correctly.

(g). We conduct 4 recognition tests for sentences and names. The recognition rates depend on test speakers:

(i). to classify 70 English sentences and names made of 154 English words (recognition rate=excellent)

(ii). to classify 407 mandarin sentences and names made of 384 mandarin syllables (recognition rate=excellent)

(iii). to classify 70 English sentences and names and 407 Mandarin sentences and names, i.e., the English and Chinese sentence and name database in Table 4 contains 70 English sentences and names and 407 mandarin sentences and names (recognition rate=excellent);

(iv). to classify 559 mandarin and 2 Taiwanese sentences and names (559 mandarin sentences made of 654 mandarin syllables and 2 Taiwanese sentences made of 3 Taiwanese syllables) (recognition rate=good)

(v). 30 known English sentences and 30 known Mandarin sentences are uttered by a speaker and each known sentence is partitioned into D known words. All known words from these 60 known sentences form a permanent database of known words for the speaker. For each known word in the permanent database, find the top N=15 unknown words with the N shortest Bayesian distances to the known word and compute the weighted averages of the N sample means of the top N=15 unknown words from 388 unknown words in the raw database and the LPCC of the known word as the means for the known word and the weighted averages of N sample variances of the top N unknown words as the variances for the known word. After re-computing the features of all known words in the word database several times, the final feature (12×12 matrix of means and variances) is the standard pattern of the known word. Test 60 sentences by the speaker and the recognition rate is excellent.

Note that excellent=almost all are identified and good=90%

TABLE 1

The following are 388 mandarin syllables whose samples are bought from the Central Research Institute (Sinica) in Taiwan. The features of 384 mandarin syllables and 1 German, 1 Japanese and 2 Taiwanese words are extracted from 388 unknown syllables without identities in the raw database.

一 七 三 上 下 不 且 丟 並 中 乃 之 九 也 亂 了 二 五 些 亞 人
仍 他 代 但 住 佛 佝 來 便 係 促 修 俪 個 們 做 停 側 償 元 光
內 全 兩 八 六 共 冷 列 別 到 刷 則 剖 創 勤 區 千 半 卡 卻 參
及 反 受 口 另 可 台 吃 同 名 向 否 呂 呢 周 和 品 哈 喔 噴 囊
四 因 團 圖 在 均 坑 坤 垂 堂 報 場 蕌 墳 外 多 夢 大 天 奈
奧 女 如 娘 媽 嫩 孫 學 宅 定 家 寧 將 對 小 少 屢 層 屯 山
崖 崩 嵯 平 年 度 庫 康 廖 廊 張 強 很 後 得 從 忙 快 怒 伯 性
怪 恩 您 愛 趕 應 成 我 或 戰 所 才 批 找 抓 抽 拉 抱 捏 掛 推
揆 提 揣 搜 撒 據 樑 擠 擊 數 文 新 方 旁 日 昂 春 是 暖 更 會
最 會 月 有 朝 木 本 李 村 東 林 某 查 栓 案 桌 桑 條 棒 森 楊
業 榮 樓 橘 橫 歉 正 此 歲 段 殺 每 比 民 水 決 況 法 波 洪 洽
派 混 港 湊 準 滅 滑 漂 潤 瀆 炸 為 然 熱 片 牛 特 率 王 瑞
瓊 瓦 甚 應 用 略 當 百 的 整 省 看 砸 福 空 窘 竇 站 第 等 算
管 篩 米 組 給 經 縣 總 羅 群 翁 老 考 肉 肯 能 自 與 船 艘 若
茂 草 莊 莫 華 萬 藏 蘇 蘭 虐 處 號 行 衙 表 被 要 言 訊 設 許
該 脫 誰 調 談 請 諾 謬 讓 讀 豐 費 買 賊 購 賽 闕 走 趺 跑 跟
購 賽 賦 走 趺 跑 頭 農 退 送 這 連 運 遭 選 還 那 邱 郎 都 配
金 錯 鎮 織 鑽 開 間 阿 陳 雄 雙 非 面 順 頓 頭 額 類 鍋 馬 騰
高 鬧 鳥 黃 黑 點 容 吃飯(台) 再見(日) 吃飽(台) Papier(德)

TABLE 2

The following are 154 English words and 1 German word which do not have any samples. The features of 154 English words and 1 German word are created by the features of 388 unknown mandarin syllables without identities in the raw database in Table 1 using the weighted average of the sample means of the top N = 15 unknown mandarin syllables surrounding the known English or German word.

one   two   three   four   five   six   seven   eight   nine
ten   chicken   turkey   egg   duck   goose   swan   cow
sheep   panda   bear   cat   dog   rabbit   horse   peacock
bird   fish   pork   beef   snake   Das   Papier   (German)   fly
mosquito   flower   red   white   black   green   blue
water   wine   vegetable   tiger   bear   lion   deer   happy
rice   bread   wheat   soybean   I   like   you   is   can
catch   swim   in   China   has   diner   and   run   fast
full   sky   cloud   many   eat   grass   are   your   good
animal   breakfast   tea   bite   beautiful   house   thank
father   call   we   study   English   made   a   mistake
he   knock   at   my   door   she   girl   listen   to
me   write   letter   buy   new   car   work   hard
celebrate   birthday   drink   coke   student   mathematics
tomorrow   New   York   don't   bridge   safe   for   automobile
gasoline   too   expensive   price   go   high   much
granddaughter   agree   with   opinion   clean   professor
coffee   drive   smart   meet   help   from   after   food
American   sorry   bother   who   rain   will   tonight   am
smile   be   careful   about   health   medicine   have   it
note: panda bear, New York, granddaughter and Das papier (German) are considered as a single English word denoted by a 12 × 12 matrix of means and variances.

TABLE 3

The following are 269 new mandarin syllables and 3 Taiwanese syllables which do not have samples. The all features are created by 388 unknown mandarin syllables without identities in Table 1 using the average of the features of the top N unknown mandarin syllables.

變 辨 明 師 聯 飛 久 酒 真 料 力 加 像 象 弱 藥 仁 幾
機 量 京 銅 忽 呼 麥 勞 速 食 店 托 巨 遊 覽 地 里 出 火
脫 軌 行 駛 司 太 危 險 坡 手 煞 急 證 院 好 生 病 道 史
丹 游 泳 拿 技 術 破 神 沒 德 心 灣 北 冬 杭 州 市 功 救
籃 帳 付 詐 騙 集 愈 聽 主 倒 退 辦 亮 母 親 部 父 認 什
麼 漲 油 汽 青 菜 活 見 斗 幹 入 質 永 遠 銀 服 務 差 嫁
龍 星 鳳 胎 濟 再 煙 美 讀 書 教 科 腦 聽 奇 單 打 獨 鬥
分 工 合 作 興 信 瞻 十 變 惡 匪 抗 遊 免 脂 食 物 過 累
責 任 發 奮 飯 飽 統 計 難 痛 苦 夫 架 育 命 註 語 花 香
狗 叫 減 肥 敢 坐 飛 安 鋼 琴 蕭 長 秀 蓮 時 流 聚 幅 畫
值 錢 腳 去 白 癡 酒 戰 贏 婆 假 鈔 惜 血 壓 升 量 細 雨
暴 棄 嘴 甜 懂 話 長 事 池 河 祝 喜 樁 梁 伯 僮 瓜 怎 辦
歌 賣 貝 喝 笑 藍 古 皇 帝 殘 懷 扁 拼 交 航 吃(台) 飯(台)
飽(台)

TABLE 4

The following is the sentence and name database made of 154 English words in Table 2 and 384 mandarin syllables in Table 1. There are 70 English sentences and names and 407 Chinese sentences and names. This is the main database for the invention to classify both English and Chinese.

| # | Entry | # | Entry | # | Entry |
|---|---|---|---|---|---|
| 1 | I like beef | 2 | you like chicken | 3 | flower is red |
| 4 | bird can fly | 5 | black cat catch fish | 6 | duck swim in water |
| 7 | China has panda bear | 8 | dinner has vegetable and pork | 9 | horse run fast |
| 10 | bread has full wheat | 11 | blue sky and white cloud | 12 | many cow eat grass |
| 13 | China has rice | 14 | are you happy | 15 | tiger and lion are animal |
| 16 | breakfast has egg and bread | 17 | you like green tea and black coffee | 18 | many mosquito bite you |
| 19 | peacock is beautiful | 20 | deer run fast | 21 | your father call you |
| 22 | we study English | 23 | he write a letter | 24 | you made a mistake |
| 25 | he knock at my door | 26 | she is a girl | 27 | listen to me |
| 28 | you work hard | 29 | you buy a new car | 30 | we celebrate your birthday |
| 31 | you drink wine and I drink coke | 32 | student study mathematics | 33 | tomorrow I fly to New York |
| 34 | I don't like mathematics | 35 | bridge is safe for automobile | 36 | gasoline is too expensive |
| 37 | gasoline price go high | 38 | my granddaughter is beautiful | 39 | I agree with your opinion |
| 40 | I clean my house | 41 | my granddaughter eat breakfast | 42 | don't drink wine you have to drive |
| 43 | panda bear eat vegetable | 44 | professor like to run | 45 | mathematics professor is smart |
| 46 | cow eat grass | 47 | peacock is a bird | 48 | I am happy to meet you |
| 49 | thank you for your help | 50 | sheep eat grass and drink water | 51 | I eat bread and egg for breakfast |
| 52 | duck can swim and fly | 53 | professor and student work hard | 54 | beef is made from cow |
| 55 | a new car is expensive | 56 | New York has many car | 57 | you eat too much |
| 58 | a horse run after car | 59 | a cat run after rabbit | 60 | vegetable and soybean are good food |
| 61 | you are American | 62 | I am sorry to bother you | 63 | I don't like fast food |
| 64 | who are you | 65 | it will rain tonight | 66 | I am good in mathematics |
| 67 | she smile to me | 68 | be careful about your health | 69 | medicine is hard to study |
| 70 | thank you for your food | 71 | 一 半 | 72 | 一 二 三 |
| 73 | 一 元 | 74 | 一 個 | 75 | 一 人 一 個 |
| 76 | 一 口 | 77 | 一 台 | 78 | 一 千 元 |
| 79 | 一 別 六 年 | 80 | 七 上 八 下 | 81 | 一 周 七 天 |
| 82 | 一 年 有 多 少 天 | 83 | 上 樓 | 84 | 上 面 |
| 85 | 上 中 下 | 86 | 下 台 | 87 | 上 學 |
| 88 | 不 是 你 | 89 | 不 要 來 | 90 | 不 可 能 |
| 91 | 不 用 了 | 92 | 不 能 做 | 93 | 不 會 |
| 94 | 不 錯 | 95 | 不 應 該 | 96 | 一 歲 |
| 97 | 並 且 | 98 | 中 間 | 99 | 中 華 民 國 |
| 100 | 中 學 | 101 | 中 國 | 102 | 六 六 大 順 |
| 103 | 亂 來 | 104 | 亂 成 一 團 | 105 | 七 八 九 |
| 106 | 人 家 | 107 | 人 類 | 108 | 你 們 |
| 109 | 你 家 | 110 | 你 來 了 | 111 | 你 很 忙 |
| 112 | 你 是 壞 人 | 113 | 三 代 同 堂 | 114 | 一 二 三 四 五 六 七 |
| 115 | 四 五 六 | 116 | 但 是 | 117 | 住 家 |
| 118 | 有 住 人 | 119 | 佛 光 山 | 120 | 你 很 不 錯 |
| 121 | 你 很 壞 | 122 | 不 要 你 來 | 123 | 人 人 怕 你 |
| 124 | 你 是 木 頭 人 | 125 | 你 來 了 | 126 | 來 的 方 向 |
| 127 | 方 便 | 128 | 修 橋 | 129 | 修 面 |
| 130 | 修 車 | 131 | 修 水 管 | 132 | 修 路 |
| 133 | 倆 個 人 | 134 | 倆 個 少 女 | 135 | 個 個 很 怪 |
| 136 | 你 們 是 一 家 人 | 137 | 做 做 看 | 138 | 停 車 |
| 139 | 停 水 了 | 140 | 側 所 | 141 | 你 從 側 們 走 |
| 142 | 元 朝 | 143 | 僧 住 在 廟 內 | 144 | 一 百 元 |
| 145 | 光 說 不 做 | 146 | 用 光 了 | 147 | 你 很 內 向 |
| 148 | 你 是 我 的 內 人 | 149 | 全 是 我 的 | 150 | 一 兩 要 多 少 |
| 151 | 八 口 人 家 | 152 | 共 住 一 間 | 153 | 很 冷 |
| 154 | 冷 到 八 度 | 155 | 第 一 列 | 156 | 別 說 了 |
| 157 | 不 要 不 要 | 158 | 不 要 管 我 | 159 | 船 到 了 |
| 160 | 此 路 到 台 中 | 161 | 我 馬 上 到 | 162 | 你 可 刷 卡 |
| 163 | 馬 上 滾 | 164 | 創 下 第 一 名 | 165 | 勤 快 |
| 166 | 創 下 新 高 | 167 | 區 區 小 款 | 168 | 區 別 不 同 |
| 169 | 千 年 不 壞 | 170 | 千 山 萬 水 | 171 | 一 人 一 半 |
| 172 | 一 半 也 不 錯 | 173 | 卡 住 | 174 | 刷 卡 |
| 175 | 金 卡 | 176 | 參 賽 | 177 | 來 不 及 |
| 178 | 是 誰 要 你 來 | 179 | 是 誰 反 對 你 | 180 | 反 面 |
| 181 | 反 對 | 182 | 誰 反 對 中 華 民 國 | 183 | 一 口 一 口 的 吃 |
| 184 | 一 家 四 口 | 185 | 另 外 還 有 | 186 | 你 是 另 類 |
| 187 | 可 大 可 小 | 188 | 牛 肉 可 口 | 189 | 台 東 |
| 190 | 全 台 很 冷 | 191 | 有 吃 的 | 192 | 有 牛 肉 吃 |
| 193 | 有 米 吃 | 194 | 同 名 | 195 | 我 們 是 同 學 |
| 196 | 一 同 上 學 | 197 | 方 向 不 對 | 198 | 性 向 不 同 |
| 199 | 否 定 | 200 | 否 決 提 案 | 201 | 很 周 全 |
| 202 | 很 周 到 | 203 | 和 平 | 204 | 和 你 在 一 個 國 家 |
| 205 | 和 不 來 | 206 | 跟 我 和 得 來 | 207 | 一 品 大 人 |
| 208 | 品 學 都 不 錯 | 209 | 哈 哈 我 第 一 | 210 | 台 東 米 庫 |
| 211 | 高 雄 金 庫 | 212 | 臺 中 有 金 | 213 | 四 千 金 |
| 214 | 四 對 新 人 | 215 | 因 為 他 很 忙 | 216 | 有 家 才 有 國 |
| 217 | 國 民 所 得 | 218 | 不 要 看 這 個 圖 | 219 | 圖 比 達 大 |
| 220 | 我 們 在 車 上 | 221 | 我 們 在 輪 船 上 | 222 | 他 們 在 忙 |

TABLE 4-continued

The following is the sentence and name database made of 154 English words in Table 2 and 384 mandarin syllables in Table 1. There are 70 English sentences and names and 407 Chinese sentences and names. This is the main database for the invention to classify both English and Chinese.

| | | | | | |
|---|---|---|---|---|---|
| 223 | 平均是多少 | 224 | 均等 | 225 | 一個坑有多大 |
| 226 | 路上有坑 | 227 | 鐵垂 | 228 | 堂堂正正的人 |
| 229 | 中山堂 | 230 | 我不看報 | 231 | 你會有報應 |
| 232 | 場外都是人和車 | 233 | 場內場外都是人 | 234 | 塞住了 |
| 235 | 你很壞 | 236 | 車壞了 | 237 | 你個性外向 |
| 238 | 有多少算多少 | 239 | 很多呢 | 240 | 夢中人 |
| 241 | 你做夢 | 242 | 天天開門 | 243 | 天下我最大 |
| 244 | 說一套做一套 | 245 | 奧們不是這個奧 | 246 | 你如來我不饒你 |
| 247 | 老娘不饒你 | 248 | 我的孫女是娟娟 | 249 | 肉有點嫩 |
| 250 | 我的孫女漂漂 | 251 | 學區很壞 | 252 | 不要學壞 |
| 253 | 住宅區很壞 | 254 | 一定要來 | 255 | 一家八口 |
| 256 | 山將會崩 | 257 | 您尊大人 | 258 | 對我比較治當 |
| 259 | 你上小學 | 260 | 我吃少一點 | 261 | 我是第一屆 |
| 262 | 我住第四層大樓 | 263 | 崖很高 | 264 | 和平算了 |
| 265 | 第六學年 | 266 | 大學 | 267 | 熱水一百度 |
| 268 | 車庫很小 | 269 | 我家小康 | 270 | 廟內有一個和上 |
| 271 | 張開口 | 272 | 第一是強棒 | 273 | 後來趕上 |
| 274 | 得到一張卡 | 275 | 忙中有錯 | 276 | 快下來 |
| 277 | 有我在不要怕 | 278 | 性別有錯 | 279 | 不會才怪 |
| 280 | 你對我有恩 | 281 | 您老人家 | 282 | 趕來開會 |
| 283 | 他應該會來 | 284 | 戳開一點 | 285 | 戳開一點 |
| 286 | 批平別人不對 | 287 | 孫女找你娘 | 288 | 抓賊 |
| 289 | 抽水 | 290 | 下一堂抽考 | 291 | 你拉開他們 |
| 292 | 拖到九點 | 293 | 捏一下 | 294 | 掛號 |
| 295 | 推下來 | 296 | 誰提這個案 | 297 | 揣側不是這個側 |
| 298 | 搜家 | 299 | 撒開 | 300 | 用擴張方法 |
| 301 | 他的數學不錯 | 302 | 文法有錯 | 303 | 我愛國文 |
| 304 | 你是新人 | 305 | 新方法 | 306 | 旁人抓住的 |
| 307 | 日月光 | 308 | 米昂貴 | 309 | 金更昂貴 |
| 310 | 春天不熱 | 311 | 是不是你 | 312 | 暖和多了 |
| 313 | 你們更棒 | 314 | 開車你會不會 | 315 | 一月多少天 |
| 316 | 總有一天你被抓 | 317 | 朝代不同 | 318 | 你我本是一家人 |
| 319 | 李台是我內人 | 320 | 我住在村莊 | 321 | 我東家不是他 |
| 322 | 我學森林 | 323 | 某行號米庫 | 324 | 查看有錯否 |
| 325 | 你吃案 | 326 | 桌面有多少 | 327 | 一條黃金 |
| 328 | 你很光榮喔 | 329 | 不要橫到走 | 330 | 此款有一點少 |
| 331 | 正當性 | 332 | 歲月不饒人 | 333 | 拉成兩段 |
| 334 | 殺人是不對的 | 335 | 每一個人都要來 | 336 | 比一比誰高 |
| 337 | 人民才是頭家 | 338 | 用熱水 | 339 | 我決定你來 |
| 340 | 況且他不能來 | 341 | 一波一波的來 | 342 | 洪水來了 |
| 343 | 不洽當 | 344 | 派你來 | 345 | 不要將壞人混和 |
| 346 | 港口不停輪船 | 347 | 你湊了多少黃金 | 348 | 你算不準 |
| 349 | 開水滾了 | 350 | 水滿了 | 351 | 人潮走了 |
| 352 | 本月是閏月 | 353 | 車被炸開 | 354 | 天然水 |
| 355 | 一片天空 | 356 | 一片瓦 | 357 | 你吃牛肉 |
| 358 | 你很特別 | 359 | 你是小王 | 360 | 你是本國人瑞 |
| 361 | 本國產黃金 | 362 | 用處不當 | 363 | 你我個性略同 |
| 364 | 百家性 | 365 | 一盤多少 | 366 | 省一點 |
| 367 | 看誰來了 | 368 | 不要砸壞了 | 369 | 你有福了 |
| 370 | 不要空說 | 371 | 你從那調來 | 372 | 不怕窖 |
| 373 | 黑馬竄來 | 374 | 站旁一點 | 375 | 一定等你 |
| 376 | 天算不如人算 | 377 | 管他的 | 378 | 找人一定要篩選 |
| 379 | 一組多少人 | 380 | 不給你 | 381 | 高雄縣 |
| 382 | 總是你不來 | 383 | 你張羅多少 | 384 | 一群馬跑走 |
| 385 | 老翁走了 | 386 | 不考數學 | 387 | 少吃肉頻 |
| 388 | 你不肯說 | 389 | 還是不能說 | 390 | 自滅 |
| 391 | 扁與馬不同頻 | 392 | 輪船停開 | 393 | 三艘船 |
| 394 | 若是你來不來 | 395 | 草不茂 | 396 | 真非是你 |
| 397 | 千錯萬錯不該來 | 398 | 也蘇 | 399 | 賊竄到我家來 |
| 400 | 不要旁人來說 | 401 | 自修 | 402 | 也蘇不是這個也 |
| 403 | 小關你在那 | 404 | 你有自虐性向 | 405 | 農業處 |
| 406 | 處方錯了 | 407 | 你亂設行號 | 408 | 車衝向我來 |
| 409 | 圖表比較自然 | 410 | 我被你追趕 | 411 | 你要不要來 |
| 412 | 一言堂 | 413 | 送訊號給我 | 414 | 設學堂 |
| 415 | 我不容許你做 | 416 | 請你將小女許配 | 417 | 該說的我都說了 |
| 418 | 你不該來 | 419 | 誰說的算 | 420 | 他民調很高 |
| 421 | 不談這個人 | 422 | 不能談 | 423 | 請自便 |
| 424 | 你的諾言有用 | 425 | 讓我走 | 426 | 讓他一下 |

TABLE 4-continued

The following is the sentence and name database made of 154 English words in Table 2 and 384 mandarin syllables in Table 1. There are 70 English sentences and names and 407 Chinese sentences and names. This is the main database for the invention to classify both English and Chinese.

| | | | | | |
|---|---|---|---|---|---|
| 427 | 台 方 言 是 讚 | 428 | 量 是 很 多 | 429 | 你 是 我 的 貴 人 |
| 430 | 賣 米 送 人 | 431 | 賊 不 要 跑 | 432 | 購 買 報 表 |
| 433 | 比 賽 | 434 | 贓 是 不 法 | 435 | 車 衝 向 走 路 人 |
| 436 | 金 下 跌 了 | 437 | 你 跟 我 來 | 438 | 跨 台 |
| 439 | 不 要 跟 我 | 440 | 跑 比 較 快 | 441 | 車 轉 方 向 |
| 442 | 農 人 虐 米 | 443 | 你 追 不 到 我 | 444 | 送 金 給 你 |
| 445 | 這 是 那 | 446 | 連 我 都 要 說 | 447 | 用 船 運 馬 |
| 448 | 哈兒濱 在 中 國 | 449 | 還 是 頭 一 遭 | 450 | 馬 遭 人 虐 |
| 451 | 民 調 高 要 選 你 | 452 | 還 是 我 做 | 453 | 邱 一 郎 是 誰 |
| 454 | 你 不 配 | 455 | 鎮 代 表 是 誰 | 456 | 鐵 口 亂 言 |
| 457 | 車 是 繼 做 的 | 458 | 鑽 比 金 貴 | 459 | 開 張 了 |
| 460 | 樓 上 這 一 間 | 461 | 阿 李 阿 郎 找 你 | 462 | 陳 言 謬 談 |
| 463 | 高 雄 是 我 家 | 464 | 我 有 一 對 孫 女 | 465 | 倆 個 是 一 雙 |
| 466 | 非 也 非 也 | 467 | 一 面 之 言 | 468 | 一 天 吃 三 頓 |
| 469 | 我 是 頭 一 個 來 | 470 | 名 額 不 多 | 471 | 人 馬 不 同 類 |
| 472 | 你 騙 了 我 | 473 | 一 騰 上 天 | 474 | 不 要 開 |
| 475 | 小 黃 鳥 不 能 站 | 476 | 黑 人 很 高 | 477 | 給 我 一 點 水 |

Figure 3:
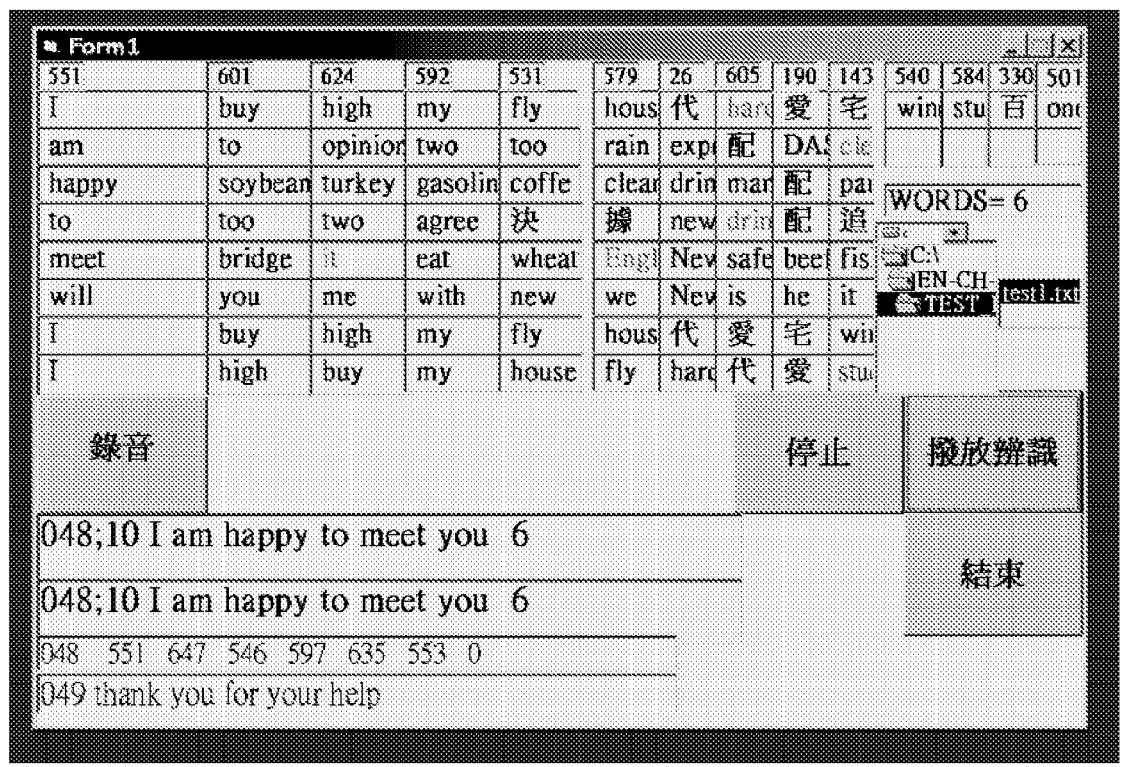
FIG. 3 a picture from visual basic show the speech recognition on 1 English sentence.
Figure 4:
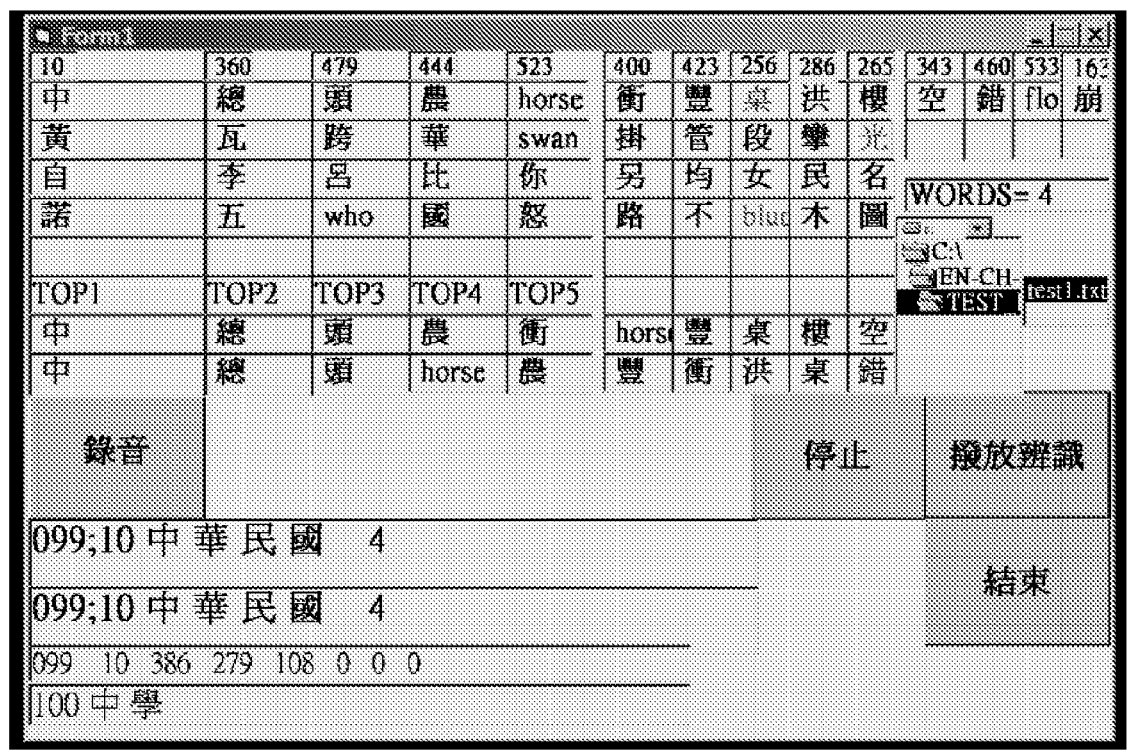
FIG. 4 a picture from visual basic show the speech recognition on 1 Chinese sentence.

(vi). 2 pictures from visual basic show the speech recognition on 1 English sentence and 1 Chinese sentence. (FIG. 3 and FIG. 4)

What is claimed is:

1. A speech recognition method for all languages without using samples provides speech recognition on all languages comprising:

(1). providing a raw database of unknown words or unknown continuous voices with having two or more samples of any languages and a raw database of unknown words or unknown voices having only words or voices without samples of any languages;

(2). providing a permanent database of known words pronounced by a speaker with a standard, clear and distinct utterance or by the testing speaker;

(3). deleting noise and the time interval without speech signal by using a processor;

(4). normalizing the whole speech waveform of a word or a continuous voice, and transforming the waveform into an equal-sized E×P=12×12 matrix of the linear predictive coding cepstra by using E=12 elastic frames without filter and without overlap;

(5). computing the sample means and sample variances of linear predict coding cepstra from the samples of each unknown word or each unknown continuous voice in the raw database having two or more samples;

(6). finding the top N unknown words by using Bayesian distances from the raw database of unknown words or voices having two or more samples with sample means and variances with the N shortest Bayesian distances to the known word in the permanent database and finding the top N unknown words or voices in the raw database of unknown words or voices having only words or voices without samples with the N shortest absolute distances to the known word in the permanent database;

(7). computing the weighted average from N+1 data of the N sample means of the top N unknown words in the raw database of unknown words having two or more samples with sample means and variances with the N shortest Bayesian distances to the known word and one linear predictive coding cepstra of the known word in the permanent database as the mean for the known word, computing the weighted average from N data of the N sample variances of the top N unknown words as the variance for the known word for each known word in the permanent database, denoting the E×P=12×12 matrix of the means and the variances of the known word as the feature of the known word, called the standard pattern of the known word and saving the standard pattern of the known word with other known words of several different languages into the word database and making necessary sentences or names from front the known words in the word database to be saved into the sentence and name database;

(8). if the unknown words or voices in the raw database do not have samples, considering the N linear predictive coding cepstra (LPCC) of the top N unknown words in the raw database with the N shortest distances to the known word and the LPCC of the known word in the permanent database as (N+1) data, computing the mean (weighted average) and the variance of (N+1) data and saving the E×P=12×12 matrix of the means and the variances, called the feature of the known word as the standard pattern, into the word database;

(9). normalizing the whole waveform of an input unknown word by using E=12 elastic frames without filter and without overlap and transforming the whole waveform into an equal-sized E×P=12×12 matrix of linear predictive coding cepstra, called the categorizing pattern of the unknown word;

(10). matching the standard pattern of every known word in the word database with the categorizing pattern of an input unknown word and finding a known word in the word database with the least Bayesian distance to the unknown word to be the unknown word by using a simplified Bayesian decision classifier;

(11). partitioning an unknown sentence or name into D unknown words;

(12). finding the top F similar known words from the word database for each unknown word by the Bayesian classifier, and representing an unknown sentence or name by a D×F matrix of known similar words of several languages;

(13). matching the D×F matrix of similar known words denoting an unknown sentence or name with all known sentences and names in the sentence and name database and finding a known sentence or name in the sentence and name database with the highest probability to be the unknown sentence or name;

(14). improving the feature of an unknown word in the input unknown sentence or name such that the input unknown word sentence or name is guaranteed to be recognized correctly.

2. The speech recognition method for all languages without using samples of claim 1 wherein said step (3) further includes deleting noise:
   (a) computing the variance of sampled points in a unit time interval and deleting the unit time interval, where the variance in the unit time interval is less than the variance of noise;
   (b). computing the total sum of absolute distances between any two consecutive sampled points in a unit time interval and deleting the unit time interval where the total sum of absolute distances is less than the total sum of noise.

3. The speech recognition method for all languages without using samples of claim 1 wherein said step (4) further includes normalizing and transforming signal waveform of a word or a continuous voice into an equal-sized E×P=12×12 matrix of linear predictive coding cepstra:
   (a). partitioning the whole waveform of a word or a continuous voice into E=12 equal sections and forming each section as an elastic frame window without filter and without overlap such that E=12 equal elastic frames can contract and expand themselves to cover the whole waveform;
   (b). using a linear regression model with P=12 regression coefficients to estimate the nonlinear time-varying waveform in each elastic frame and producing P=12 linear predictive coding coefficients by using the least squares method;
   (c). using Durbin's recursive equations with N points in each frame $$R(i) = \sum_{n=0}^{N-i} S(n)S(n+i), i \geq 0$$

$$E_0 = R(0)$$

$$k_i = \left[R(i) - \sum_{j=1}^{i-1} a_j^{(i-1)} R(i-j)\right] / E_{i-1}$$

$$a_i^{(i)} = k_i$$

$$a_j^{(i)} = a_j^{(i-1)} - k_i a_{i-j}^{(i-1)}, 1 \leq j \leq i-1$$

$$E_i = (1 - k_i^2) E_{i-1}$$

$$a_j, a_j^{(P)}, 1 \leq j \leq P$$

to compute the least squares estimates $\alpha_j$, $1 \leq i \leq P$ called the linear predictive coding coefficient vector and using the equations $$\hat{a}_i = a_i + \sum_{j=1}^{i-1} \left(\frac{j}{i}\right) a_{i-j} \hat{a}_j, 1 \leq i \leq P$$

$$\hat{a}_i = \sum_{j=i-P}^{i-1} \left(\frac{j}{i}\right) a_{i-j} \hat{a}_j, P < i$$

to transform linear predictive coding coefficient vector into the more stable linear predictive coding cepstra vector $\hat{\alpha}_i$, $1 \leq i \leq P$;

(d). representing E=12 linear predictive coding cepstra vectors, denoted by E×P=12×12 matrix of linear predictive coding cepstra, to be a word or a continuous voice.

4. The speech recognition method for all languages without using samples of claim 1 wherein said step (5) further includes computing the sample means and sample variances of an unknown word or an unknown voice in the raw database of unknown words or voices with two or more samples:
   (a). partitioning the whole waveform of the unknown word or an unknown voice into E=12 equal sections and forming each section as an elastic frame without filter and without overlap;
   (b). using a linear regression model with P=12 regression coefficients in each of E=12 elastic frame to estimate the nonlinear, time-varying waveform and producing a linear predictive coding coefficient vector by using the lease squares method;
   (c). implementing the least squares method by using Durbin's recursive equations;

$$R(i) = \sum_{n=0}^{N-i} S(n)S(n+i), i \geq 0$$

$$E_0 = R(0)$$

$$k_i = \left[R(i) - \sum_{j=1}^{i-1} a_j^{(i-1)} R(i-j)\right] / E_{i-1}$$

$$a_i^{(i)} = k_i$$

$$a_j^{(i)} = a_j^{(i-1)} - k_i a_{i-j}^{(i-1)}, 1 \leq j \leq i-1$$

$$E_i = (1 - k_i^2) E_{i-1}$$

$$a_j = a_j^{(P)}, 1 \leq j \leq P$$

to compute linear predictive coding coefficient vector $\alpha_j$, $j=1, \ldots, P$;

(d). transforming the linear predictive coding coefficient vector into a more stable linear predictive coding cepstra vector $\hat{\alpha}_i$, $i=1, \ldots, P$, by the equations $$\hat{a}_i = a_i + \sum_{j=1}^{i-1} \left(\frac{j}{i}\right) a_{i-j} \hat{a}_j, 1 \leq i \leq P$$

$$\hat{a}_i = \sum_{j=i-P}^{i-1} \left(\frac{j}{i}\right) a_{i-j} \hat{a}_j, P < i;$$

(e). using the E×P=12×12 matrices of linear predictive coding cepstra of the samples of an unknown word or an unknown continuous voice having two or more samples to compute the sample means and sample variances of the unknown word or the unknown voice and saving them into the raw database having two or more samples.

5. The speech recognition method for all languages without using samples of claim 1 wherein said step (6) further includes using a simplified Bayesian classifier to find the top N unknown word or continuous voices from the raw database having two or more samples with sample means and variances for each known word in the permanent database:
   (a). representing a known word in the permanent database by using a E×P=12×12 matrix of linear predictive coding cepstra, by X={$X_{jl}$}, j=1, ..., E, l=1, ..., P;
   (b). assuming that E×P=12×12 {$X_{jl}$} are independent and have normal distribution;

(c). denoting the means and variances of the known word $\{X_{jl}\}$ by $(\mu_{ijl}, \sigma_{ijl}^2)$ which are estimated by the sample means and sample variances made of the samples of unknown word or voice $\omega_i$ in the raw database having two or more samples, if the known word $\{X_{jl}\}$ in the permanent database is compared with the unknown word or the unknown continuous voice $\omega_i$, i=1, . . . , M, (M is the total number of unknown words or voices) in the raw database of unknown words having two or more samples;

(d). denoting the density of X by using $$f(x|\omega_i) = \left[\prod_{jl}\frac{1}{\sqrt{2\pi}\,\sigma_{ijl}}\right]e^{-\frac{1}{2}\sum_{jl}\left(\frac{x_{jl}-\mu_{ijl}}{\sigma_{ijl}}\right)^2}$$

where $X=\{X_{jl}\}$ is the $E\times P=12\times 12$ matrix of linear predictive coding cepstra of the known word in the permanent database;

(e) matching the known word in the permanent database with all unknown words and all unknown continuous voices in the raw database having two or more samples by using a simplified Bayesian classifier;

(f). computing the similarity between the known word $X=\{X_{jl}\}$ and the unknown word $\omega_i$ with the density $f(x|\omega_i)$ by using the Bayesian decision rule, $$f(x|\omega_i) = \left[\prod_{jl}\frac{1}{\sqrt{2\pi}\,\sigma_{ijl}}\right]e^{-\frac{1}{2}\sum_{jl}\left(\frac{x_{jl}-\mu_{ijl}}{\sigma_{ijl}}\right)^2};$$

(g). after taking the logarithmic value of $f(x|\omega_i)$ and deleting unnecessary constants, representing the similarity by using a Bayesian distance, called a Bayesian classifier $$l(\omega_i) = \sum_{jl}\ln(\sigma_{ijl}) + \frac{1}{2}\sum_{jl}\left(\frac{x_{jl}-\mu_{ijl}}{\sigma_{ijl}}\right)^2;$$

(h). for each unknown word $\omega_i$, i=1, . . . , M, in the raw database having two or samples, computing the Bayesian distance $l(\omega_i)$ from the known word X to the unknown word $\omega_i$ in (g);

(i). selecting the top N unknown words in the raw database having two or more samples with sample means and variances surrounding the known word by using the N shortest Bayesian distances $l(\omega_i)$ to the known word X in the permanent database to compute the feature of the known word in the permanent database, called the standard pattern of the known word.

6. The speech recognition method for all languages without using samples of claim 1 wherein said step (11) further includes partitioning an unknown sentence or name into D unknown words:

(a). computing the total sum of absolute distances of two consecutive sampled points in a unit time interval and the unit time interval not containing any speech signals if the total sum of absolute distances is less than the total sum of noise;

(b) finding the border line between two unknown words if the unit time intervals without speech signal are cumulated more than the time between two syllables in a word, and partitioning an unknown sentence or name into D unknown words on the border lines;

(c). normalizing the waveform of each of D unknown words by E=12 elastic frames without filter and without overlap and finding in each frame the linear predictive coding coefficient vector and linear predictive coding cepstra, representing an unknown word by 12×12 matrix of linear predictive coding cepstra, and representing the unknown sentence or name by D12×12 matrices of linear predictive coding cepstra.

7. The speech recognition method for all languages without using samples of claim 1 wherein said step (12) further includes using a Bayesian classifier to find the top F similar known words for each unknown word in the unknown sentence or name:

(a). partitioning an unknown sentence or name into D unknown words, denoting each unknown word by E×P=12×12 matrix of linear predictive coding cepstra $\{x_{jl}\}$, and using the Bayesian distance $$l(\omega_i) = \sum_{ijl}\ln(\sigma_{ijl}) + \frac{1}{2}\sum_{jl}\left(\frac{x_{jl}-\mu_{ijl}}{\sigma_{ijl}}\right)^2, i=1, \ldots, m$$

to find its top F similar known words $\omega_i$, i=1, . . . , F, with means and variances $\{\mu_{ijl}, \sigma_{ijl}^2\}$, i=1, . . . , F, in the word database with the F shortest Bayesian distances from known words $\omega_i$, i=1, . . . , F to the unknown word $\{x_{jl}\}$;

(b). representing an unknown sentence or name by a INF matrix of similar known words which may belong to different languages.

8. The speech recognition method for all languages without using samples of claim 1 wherein said step (13) further includes recognizing the unknown sentence or name:

(a). selecting the matching sentence or name with D−1, D and D+1 known words in the sentence and name database;

(b). selecting the matching known sentence or name having D words, and comparing, in the row order, each of D rows of the top F similar known words with each of D known words in the matching sentence or name individually;

(c). the matching sentence or name being the unknown sentence or name if each row of the top F similar known words contains sequentially its corresponding known word in the matching sentence or name;

(c). deciding the matching sentence or name to be the unknown sentence or name if each row of the top F similar known words contains sequentially its corresponding known word in the matching sentence or name;

(d). if in (c), the number of correctly recognized words is not D or if the matching sentence or name contains D−1 or D+1 known words, using a 3×F screen window of 3 consecutive rows of the top F similar words in the D×F matrix of known similar words to screen each known word of the matching sentence or name, using the (i−1)-th, i-th, (i+1)-th rows of the top F similar known words to compare with the i-th known word in the matching sentence or name, using the first two rows of the top F similar words to compare with the first known word in the matching sentence or name, moving the 3×F screen window from the first to the last row, and counting the number of the known words of the matching sentence or name in the 3×F screen window;

(e). selecting the matching sentence or name with the highest probability, counted by the number of known words of the matching sentence or name in the 3×F screen window divided by the total number of words in the matching sentence or name, to be the unknown sentence or name.

9. The speech recognition method for all languages without using samples of claim 1 wherein said step (14) contains improving the feature of a word such that an unknown sentence or name is guaranteed to be recognized correctly:
- (a). if unknown sentence or name is not correctly recognized, finding the word ω of the unknown sentence or name which is not in its top F similar words;
- (b). using the Bayesian classifier to find the top N known words for the word ω, denoted by N matrices of means and variances $\{\mu_{ijl}, \sigma_{ijl}^2\}$, i=1, ..., N, from the word database with the N shortest Bayesian distances to the word ω, computing the weighted average of N matrices, $$\mu_{jl} = \sum_{i=1}^{N} \mu_{ijl}/N, \; \sigma_{jl}^2 = \sum_{i=1}^{N} \sigma_{ijl}^2/N$$

and replacing the standard pattern of the word ω in the word database by the averages $\{\mu_{jl}\sigma_{jl}^2\}$, j=1, ..., E, l=1, ..., P, as a new feature and saving the new feature of the word ω as a new standard pattern of the word ω into the word database;
- (c). using the Bayesian classifier to find the top N known words for the word ω, denoted by N matrices of means and variances $\{\mu_{ijl}, \sigma_{ijl}^2\}$, i=1, ..., N, from the word database with the N shortest Bayesian distances to the word ω, computing the weighted average from N+1 data of the linear predictive coding cepstra of the word ω uttered by the test speaker and the N means of the top N known words in the word database with the N shortest Bayesian distances to the word ω as the mean $\mu_{jl}$, computing the weighted average from N data of the N variances of the top N known words surrounding the word ω as the variance $\sigma_{jl}^2$ and replacing the standard pattern of the word ω by $\{\mu_{jl}, \sigma_{jl}^2\}$, j=1, ..., E, l=1, ..., P, as the new feature and saving the new feature as the new standard pattern of the word ω into the word database.

\* \* \* \* \*